United States Patent
Tanabe (10) Patent No.: US 10,427,626 B2
(45) Date of Patent: Oct. 1, 2019

(54) VEHICLE CONTROL DEVICE

(71) Applicant: HITACHI AUTOMOTIVE SYSTEMS, LTD., Hitachinaka-shi, Ibaraki (JP)

(72) Inventor: Itaru Tanabe, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 2 days.

(21) Appl. No.: 15/544,104

(22) PCT Filed: Jan. 29, 2016

(86) PCT No.: PCT/JP2016/052569
§ 371 (c)(1),
(2) Date: Jul. 17, 2017

(87) PCT Pub. No.: WO2016/125690
PCT Pub. Date: Aug. 11, 2016

(65) Prior Publication Data
US 2017/0361787 A1    Dec. 21, 2017

(30) Foreign Application Priority Data

Feb. 5, 2015  (JP) .................................. 2015-020968

(51) Int. Cl.
*B60R 16/02*    (2006.01)
*G06F 1/26*    (2006.01)
(Continued)

(52) U.S. Cl.
CPC ................ *B60R 16/02* (2013.01); *G06F 1/26* (2013.01); *H02J 1/10* (2013.01); *H02J 1/102* (2013.01); *H02J 2001/008* (2013.01)

(58) Field of Classification Search
CPC .... B60R 16/02; G06F 1/26; H02J 1/10; H02J 1/102; H02J 2001/008
See application file for complete search history.

(56) References Cited

U.S. PATENT DOCUMENTS 6,236,194 B1 * 5/2001 Manabe .................. G05F 1/565
                                                                    323/274
7,148,665 B2 * 12/2006 Agari ...................... G05F 1/565
                                                                    323/268
(Continued)

FOREIGN PATENT DOCUMENTS

JP     H05-189065 A     7/1993
JP     H07-095734 A     4/1995
(Continued)

OTHER PUBLICATIONS

International Search Report dated Apr. 12, 2016 as issued in corresponding International Application No. PCT/JP2016/052569.
(Continued)

*Primary Examiner* — Daniel Kessie
(74) *Attorney, Agent, or Firm* — Foley & Lardner LLP (57) ABSTRACT

Provided is a vehicle control device comprising a plurality of constant voltage generation circuits, wherein a specified voltage is supplied to a load even if any one of the constant voltage generation circuits outputs a voltage that exceeds the specified voltage.
This vehicle control device is provided with a first and second constant voltage generation circuit that each output a voltage to a load, and when either the first or second constant voltage generation circuit outputs a voltage that exceeds a reference voltage, cuts off the output of that constant voltage generation circuit from the load.

8 Claims, 6 Drawing Sheets

(51) Int. Cl.
*H02J 1/10* (2006.01)
*H02J 1/00* (2006.01)

(56) References Cited

U.S. PATENT DOCUMENTS

| | | | |
|---|---|---|---|
| 9,886,079 B2* | 2/2018 | Ito | G06F 1/3287 |
| 2002/0097022 A1* | 7/2002 | Saeki | H02J 7/045 |
| | | | 320/125 |
| 2005/0168934 A1* | 8/2005 | Wendel | G11B 33/08 |
| | | | 361/679.36 |
| 2007/0150765 A1* | 6/2007 | Ochiai | G06F 1/3203 |
| | | | 713/300 |
| 2007/0260918 A1* | 11/2007 | Okada | G06F 1/30 |
| | | | 714/14 |
| 2008/0191042 A1 | 8/2008 | Kimmich et al. | |
| 2008/0224675 A1* | 9/2008 | Takagi | G05F 1/565 |
| | | | 323/275 |
| 2008/0250256 A1* | 10/2008 | Hagiwara | G06F 1/30 |
| | | | 713/300 |
| 2008/0309163 A1 | 12/2008 | Hashimoto et al. | |
| 2009/0082910 A1* | 3/2009 | Sato | G06F 1/263 |
| | | | 700/297 |
| 2010/0115321 A1* | 5/2010 | Fujimoto | G06F 1/26 |
| | | | 713/340 |
| 2010/0201200 A1* | 8/2010 | Hori | H02J 1/08 |
| | | | 307/82 |
| 2012/0331313 A1* | 12/2012 | Yoshioka | G06F 1/263 |
| | | | 713/300 |
| 2015/0091382 A1* | 4/2015 | Ikenaga | H02J 1/10 |
| | | | 307/52 |
| 2015/0224946 A1* | 8/2015 | Sato | B60R 16/03 |
| | | | 307/9.1 |

FOREIGN PATENT DOCUMENTS

| | | |
|---|---|---|
| JP | H10-108363 A | 4/1998 |
| JP | H11-3125 A | 1/1999 |
| JP | 2006-254672 A | 9/2006 |
| JP | 2013-156874 A | 8/2013 |
| WO | WO-2013/088996 A1 | 6/2013 |

OTHER PUBLICATIONS

Written Opinion dated Apr. 12, 2016 as issued in corresponding International Application No. PCT/JP2016/052569.
Japanese Office Action issued in corresponding application No. 2016-573322 dated Mar. 13, 2018.
Supplementary European Search Report issued in corresponding application No. 16 74 6521.0 dated May 24, 2018.

* cited by examiner

VEHICLE CONTROL DEVICE

TECHNICAL FIELD

The present invention relates to a vehicle control device that controls an operation of a vehicle.

BACKGROUND ART

A vehicle control device can control an operation of a vehicle by performing a control operation with an arithmetic logic unit of a microcomputer or a central processing unit (CPU). Since the arithmetic logic unit generally needs to be supplied with a constant voltage, the vehicle control device is provided with a constant voltage generation circuit. The constant voltage generation circuit generally receives a supply of a higher voltage from a power source such as a battery used by the vehicle control device, and converts this voltage into a specified constant voltage to supply to a load circuit, such as the arithmetic logic unit.

PTL 1 below discloses a technology relating to a power supply switching circuit that switches a first and second power supplies. In PTL 1, a voltage of the first power supply and a voltage of the second power supply are compared, and a transistor provided between a load and a power supply having a higher voltage is turned ON (refer to Abstract).

CITATION LIST

Patent Literature

PTL 1: JP 2006-254672 A

SUMMARY OF INVENTION

Technical Problem

In the technology described in PTL 1 above, it is considered that a specified voltage can be maintained even when an output voltage of either power supply drops to less than the specified voltage. However, in occurrence of an abnormality in which an output voltage of either power supply exceeds the specified voltage, the voltage that exceeds the specified voltage is supplied to the load since a transistor between the load and a power supply having a higher voltage is turned ON, which may cause an abnormal operation of the load.

The present invention has been made in view of the above problem, and it is an object of the present invention to provide a vehicle control device including a plurality of constant voltage generation circuits, in which a specified voltage is supplied to a load even if any one of the constant voltage generation circuits outputs a voltage that exceeds the specified voltage.

Solution to Problem

A vehicle control device according to the present invention is provided with a first and second constant voltage generation circuits that each output a voltage to a load, and when either the first or second constant voltage generation circuit outputs a voltage that exceeds a reference voltage, cuts off the output of that constant voltage generation circuit from the load.

Advantageous Effects of Invention

The vehicle control device according to the present invention can continuously supply a specified voltage to the load, even when either the first or second constant voltage generation circuit generates an abnormal voltage that exceeds the specified voltage.

DESCRIPTION OF EMBODIMENTS

First Embodiment: Device Configuration

Figure 1:
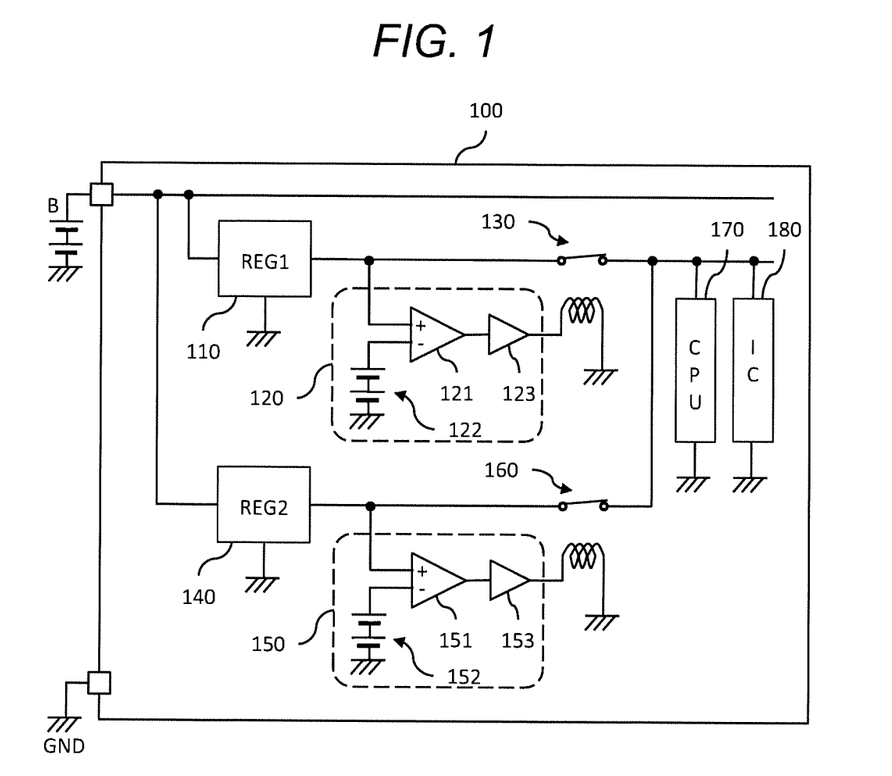
FIG. 1 is a circuit diagram of a vehicle control device 100 according to a first embodiment.

FIG. 1 is a circuit diagram of a vehicle control device 100 according to a first embodiment of the present invention. The vehicle control device 100 is a device that performs processing to control an operation of a vehicle, and includes a first constant voltage generation circuit 110, a first high voltage detection circuit 120, a first switch 130, a second constant voltage generation circuit 140, a second high voltage detection circuit 150, a second switch 160, a CPU 170, and an integrated circuit (IC) 180.

The first constant voltage generation circuit 110 receives a supply of a voltage (e.g., 14 V) from an external power supply B, and converts this voltage into a predetermined constant voltage (e.g., 5 V) to output to a load circuit, such as the CPU 170 or the IC 180.

The first high voltage detection circuit 120 is a circuit that turns OFF the first switch 130 when the first constant voltage generation circuit 110 generates a voltage that exceeds a first reference voltage. The first high voltage detection circuit 120 includes a comparator 121, a first reference voltage source 122, and a buffer 123.

The first reference voltage source 122 outputs the above-described first reference voltage (e.g., 5.5 V). The comparator 121 compares the output voltage from the first constant voltage generation circuit 110 and the first reference voltage outputted from the first reference voltage source 122. When the former is larger, the comparator 121 outputs a driving signal for turning OFF the first switch 130 to the buffer 123. The buffer 123 amplifies this driving signal to an appropriate value, to drive the first switch 130.

The first switch 130 is arranged between an output end of the first constant voltage generation circuit 110 and an input end of each the load circuit, and the output voltage of the first constant voltage generation circuit 110 is supplied to each the load circuit only when the first switch 130 is turned ON.

The second constant voltage generation circuit 140 is provided with a same function as that of the first constant voltage generation circuit 110. The output of the first constant voltage generation circuit 110 and the output of the second constant voltage generation circuit 140 are outputted to the load circuit such as the CPU 170 or the IC 180, via an output circuit described later. Although a rated power of the first constant voltage generation circuit 110 and a rated power of the second constant voltage generation circuit 140 are not necessarily the same, these rated powers are same in the first embodiment, for simplicity of description.

The second high voltage detection circuit 150 is a circuit that turns OFF the second switch 160 when the second constant voltage generation circuit 140 generates a voltage that exceeds a second reference voltage. The second high voltage detection circuit 150 includes a comparator 151, a second reference voltage source 152, and a buffer 153. Each function of these circuits is same as that of each corresponding circuit provided in the first high voltage detection circuit 120. Although the second reference voltage outputted by the second reference voltage source 152 is not necessarily the same as the first reference voltage outputted by the first reference voltage source 122, individual reference voltages are also the same in the first embodiment, considering that the rated powers of the individual constant voltage generation circuits are the same.

The second switch 160 is arranged between an output end of the second constant voltage generation circuit 140 and the input end of each the load circuit, and the output voltage of the second constant voltage generation circuit 140 is supplied to each the load circuit only when the second switch 160 is turned ON.

The first switch 130 and the second switch 160 can be configured, for example, by using a component such as an electric relay. However, the configuration is not limited to this, as long as a same operation can be achieved.

First Embodiment: Normal Operation

When the external power supply B is supplied to the vehicle control device 100, the first constant voltage generation circuit 110 generates and outputs a specified constant voltage. The constant voltage generated by the first constant voltage generation circuit 110 is inputted to the comparator 121. The comparator 121 is also inputted with the first reference voltage outputted by the first reference voltage source 122. When the constant voltage inputted to the comparator 121 is equal to or less than the first reference voltage, the comparator 121 turns ON the first switch 130. Consequently, the constant voltage generated by the first constant voltage generation circuit 110 is supplied to the CPU 170 and the IC 180.

When the external power supply B is supplied to the second constant voltage generation circuit 140, the second constant voltage generation circuit 140 generates and outputs a specified constant voltage. The constant voltage generated by the second constant voltage generation circuit 140 is inputted to the comparator 151. The comparator 151 is also inputted with the second reference voltage outputted by the second reference voltage source 152. When the constant voltage inputted to the comparator 151 is equal to or less than the second reference voltage, the comparator 151 turns ON the second switch 160.

Consequently, the constant voltage generated by the second constant voltage generation circuit 140 is supplied to the CPU 170 and the IC 180.

The output end of the first switch 130 and the output end of the second switch 160 are connected to the input end of each the load circuit via the output circuit configured by, for example, a wired OR circuit or the like. The output circuit outputs any larger one of the output voltage of the first switch 130 and the output voltage of the second switch 160, to each load circuit. Therefore, in the normal operation, each the load circuit is supplied with the constant voltages each generated by the first constant voltage generation circuit 110 and the second constant voltage generation circuit 140.

First Embodiment: Operation when Voltage Drops

It is assumed that the voltage generated by the first constant voltage generation circuit 110 drops to less than the specified voltage (e.g., 3 V) due to a cause such as an element failure.

The outputs of individual constant voltage generation circuits are connected via the output circuit of wired OR that is arranged to each of the output end of the first switch 130 and the output end of the second switch 160. Consequently, even when the constant voltage generated by the first constant voltage generation circuit 110 drops, as long as the constant voltage generated by the second constant voltage generation circuit 140 is normal, a higher one of these voltages (i.e., the output voltage of the second constant voltage generation circuit 140) is supplied to the load circuit. Thus, the vehicle control device 100 can continue the normal operation. The same result is obtained when the output voltage of the second constant voltage generation circuit 140 drops.

First Embodiment: Operation when Voltage Rises

It is assumed that the voltage generated by the first constant voltage generation circuit 110 exceeds the first reference voltage (e.g., 6 V) due to a cause such as an element failure.

The voltage generated by the first constant voltage generation circuit 110, which is higher than the specified voltage, is inputted to the comparator 121. Consequently, the comparator 121 detects that the voltage that exceeds the first reference voltage is inputted, and drives the first switch 130 to turn OFF. When the first switch 130 is turned OFF, the first constant voltage generation circuit 110 is electrically cut off from the load circuit, and the output voltage of the first constant voltage generation circuit 110 is not supplied to the output circuit any more. Whereas, the constant voltage generated by the second constant voltage generation circuit 140 is supplied to the load circuit via the second switch 160 and the output circuit. Therefore, the vehicle control device 100 can continue the normal operation. The same result is obtained when the output voltage of the second constant voltage generation circuit 140 exceeds the second reference voltage.

First Embodiment: Operational Flow

Figure 2:
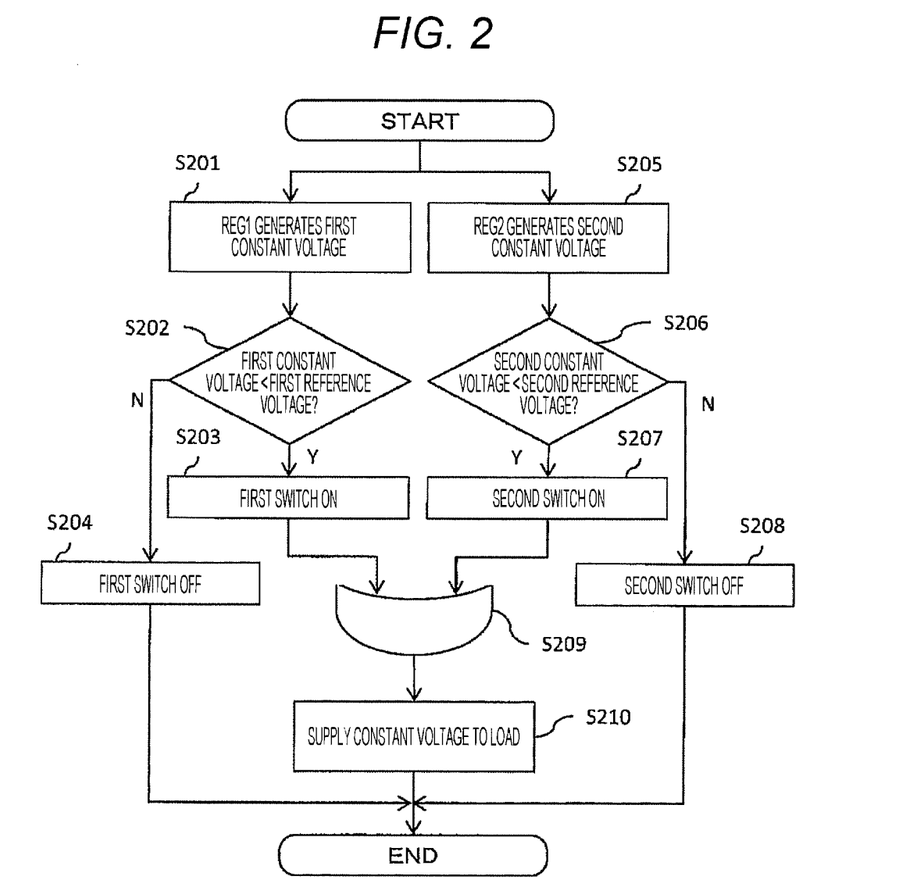
FIG. 2 is a flowchart illustrating an operational flow of the vehicle control device 100.

FIG. 2 is a flowchart illustrating an operational flow of the vehicle control device 100. The vehicle control device 100 starts this flowchart when the external power supply B is turned ON. Steps S201 to S204 and steps S205 to S208 are executed in parallel. Each step of FIG. 2 is described below. (FIG. 2: Steps S201 to S204)

The first constant voltage generation circuit 110 generates a first constant voltage (S201). The comparator 121 compares the first constant voltage generated by the first constant voltage generation circuit 110, with the first reference voltage (S202). When the first constant voltage is less than the first reference voltage, the comparator 121 turns ON the first switch 130 (S203). When the first constant voltage is equal to or more than the first reference voltage, the comparator 121 turns OFF the first switch 130 (S204). When the first switch 130 has been turned OFF, the abnormal first constant voltage generated by the first constant voltage generation circuit 110 is not supplied to the output circuit.

(FIG. 2: Steps S205 to S208)

The second constant voltage generation circuit 140 generates a second constant voltage (S205). The comparator 151 compares the second constant voltage generated by the second constant voltage generation circuit 140, with the second reference voltage (S206). When the second constant voltage is less than the second reference voltage, the comparator 151 turns ON the second switch 160 (S207). When the second constant voltage is equal to or more than the second reference voltage, the comparator 151 turns OFF the second switch 160 (S208). When the second switch 160 has been turned OFF, the abnormal second constant voltage generated by the second constant voltage generation circuit 140 is not supplied to the output circuit.

(FIG. 2: Steps S209 to S210)

The output voltage of the first switch 130 and the output voltage of the second switch 160 are inputted to the output circuit in parallel (S209). The output circuit outputs a higher one of these voltages to the load circuit (S210). When either one of the switches is turned OFF, only an output voltage of another switch is outputted to the load circuit.

First Embodiment: Summary

In the vehicle control device 100 according to the first embodiment, even when a constant voltage generated by either one of the constant voltage generation circuits is either less than the specified voltage or more than the reference voltage, it is possible to continuously supply a normal constant voltage generated by another constant voltage generation circuit functioning normally, to the load. This can maintain the normal operation of the vehicle control device 100 even if either one of the constant voltage generation circuits has failed. The first embodiment is particularly effective for a control device using an arithmetic circuit, such as a CPU 170 or an IC 180, that uses a constant voltage as an operating voltage.

In the first embodiment, both the two switches are turned OFF in occurrence of a failure in which both the two constant voltage generation circuits generate voltages that exceed the reference voltage, which eliminates a supply of abnormal high voltage to the load circuit. Therefore, these load circuits can be protected from element destruction.

Although the configuration including two constant voltage generation circuits has been described in the first embodiment, the same function as that of the first embodiment can be achieved even when there are three or more constant voltage generation circuits, by inputting output voltages of the constant voltage generation circuits to an OR output circuit via a switch. The same result is obtained in the following embodiments.

Although there has been described the operation where one of the constant voltage generation circuits has failed in the first embodiment, the same function as that of the first embodiment can be achieved even if a plurality of constant voltage generation circuits have failed while there are three or more constant voltage generation circuits, as long as at least one constant voltage generation circuit operates normally. The same result is obtained in the following embodiments.

Second Embodiment

Figure 3:
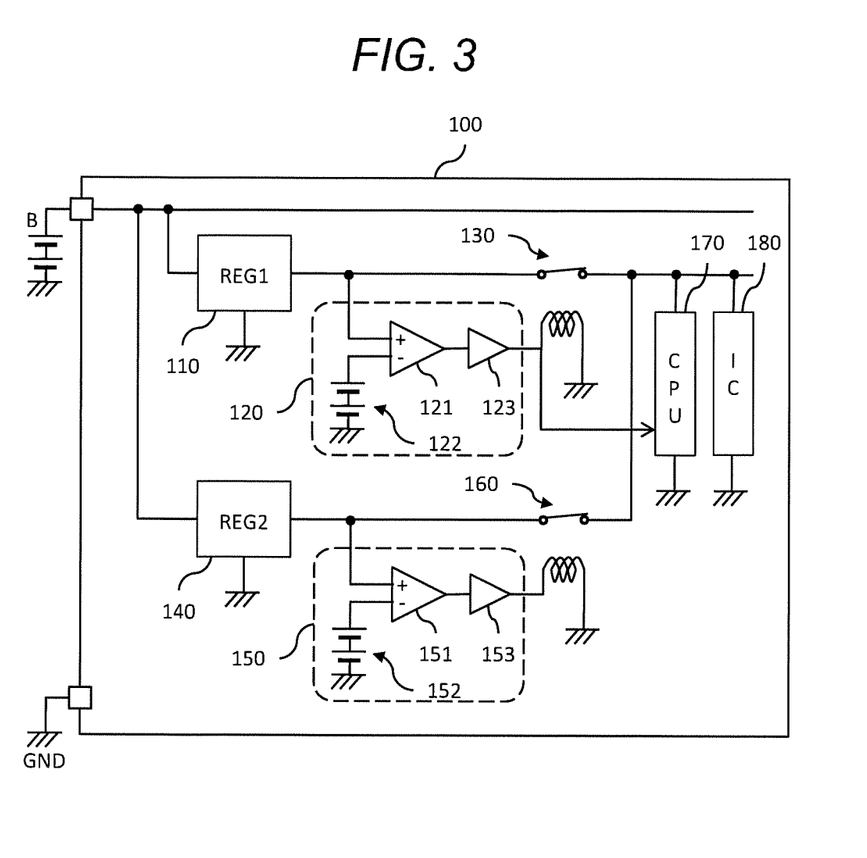
FIG. 3 is a circuit diagram of a vehicle control device 100 according to a second embodiment.

FIG. 3 is a circuit diagram of a vehicle control device 100 according to a second embodiment of the present invention.

In the second embodiment, a rated power of a first constant voltage generation circuit 110 is larger than a rated power of a second constant voltage generation circuit 140. Additionally, in the second embodiment, when a first high voltage detection circuit 120 detects that the first constant voltage generation circuit 110 generates a larger voltage than a first reference voltage, the first high voltage detection circuit 120 also notifies a CPU 170 about the generation of the voltage. Operation of the CPU 170 is described later. Since other configurations are same as those of the first embodiment, differences are mainly described below.

When the comparator 121 detects that the voltage generated by the first constant voltage generation circuit 110 exceeds the first reference voltage, the comparator 121 turns OFF a first switch 130 and notifies the CPU 170 that an abnormality has been detected.

When the CPU 170 receives a notification that the first switch 130 has been turned OFF, the CPU 170 changes contents of control processing to perform processing with lower power consumption. This is because the CPU 170 needs to operate by using only a voltage supply from the second constant voltage generation circuit 140, which has a small rated power. The CPU 170 can reduce power consumption through a method, for example, such as extending an operation period or shifting to alternate processing with a small operation load. This enables the vehicle control device 100 to continue the normal operation even if only using the second constant voltage generation circuit 140 with the small rated power.

In FIG. 3, a detection result of an output voltage of the first constant voltage generation circuit 110 is notified to the CPU 170. Alternatively, a detection result of an output voltage of the second constant voltage generation circuit 140 may be notified to the CPU 170, and the CPU 170 may shift to processing with low power consumption. This is because a capability of generating a constant voltage is lowered as a whole vehicle control device 100 when a number of the constant voltage generation circuit operating normally becomes one. Alternatively, both the detection results of the individual output voltages of the individual constant voltage generation circuits may be notified to the CPU 170.

Second Embodiment: Summary

In the vehicle control device 100 according to the second embodiment, when the constant voltage generated by any one of the constant voltage generation circuits exceeds the reference voltage, that constant voltage generation circuit is cut off from a load, and the CPU 170 shifts to an operation with small power consumption. This can maintain the operation of the vehicle control device 100 even if a power supply capacity of the constant voltage generation circuit is reduced.

In the vehicle control device 100 according to the second embodiment, the rated power of the second constant voltage generation circuit 140 is smaller than the rated power of the first constant voltage generation circuit 110. This can suppress cost of the vehicle control device 100 as compared with when there is provided a plurality of constant voltage generation circuits having equal rated powers.

Third Embodiment

Figure 4:
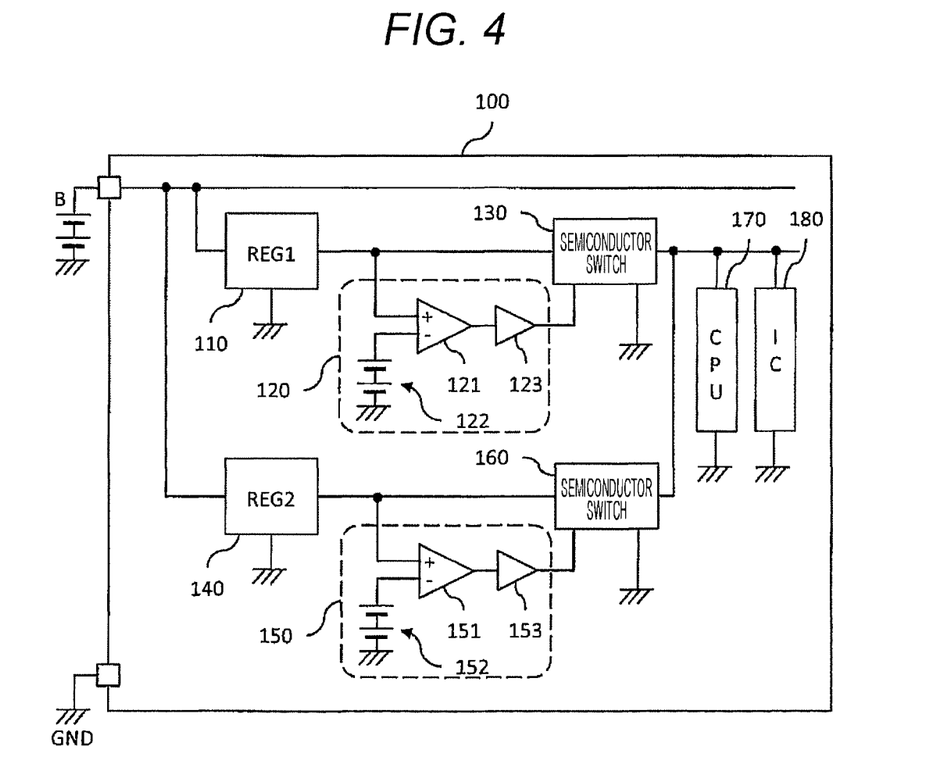
FIG. 4 is a circuit diagram of a vehicle control device 100 according to a third embodiment.

FIG. 4 is a circuit diagram of a vehicle control device 100 according to a third embodiment of the present invention. In the third embodiment, either or both of a first switch 130 and a second switch 160 are configured by using a semiconductor switch. Other configurations are same as those of the first and second embodiments. FIG. 4 has exemplified a configuration using the semiconductor switch in a circuit configuration of the first embodiment.

By using the semiconductor switch as a switch that cuts off electric conduction between a constant voltage generation circuit and a load circuit, a circuit scale of the vehicle control device 100 can be reduced, and cost can be suppressed, while a same effect as that of the first and second embodiments is provided. Additionally, since the semiconductor switch is easy to mount on a circuit board, it is particularly useful for a device that electronically controls an operation of a vehicle.

Fourth Embodiment

Figure 5:
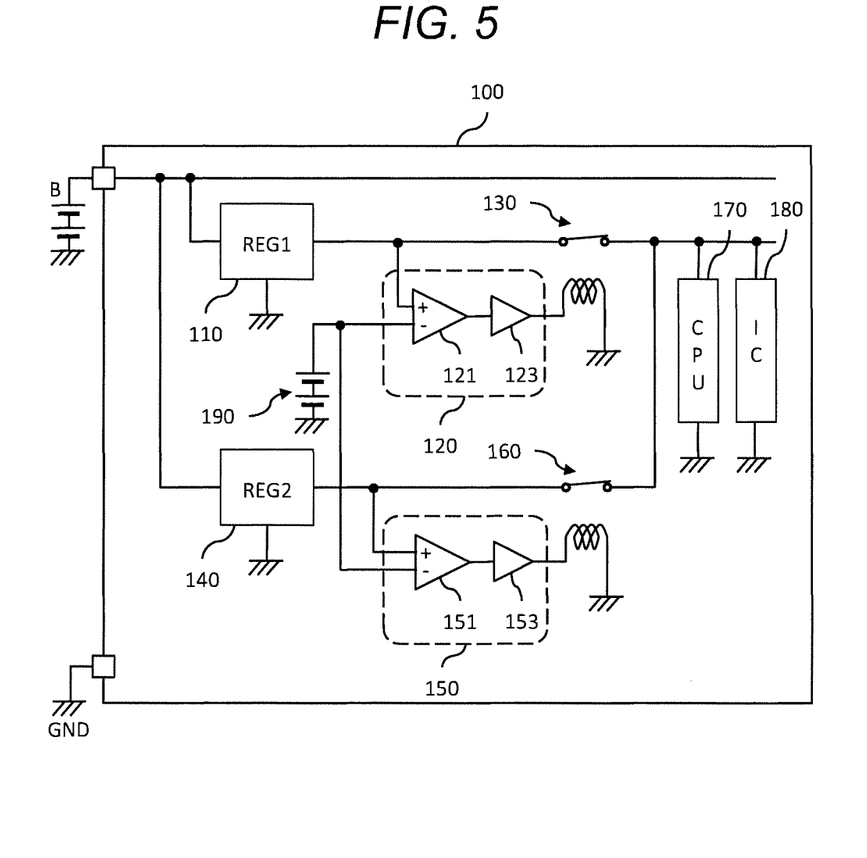
FIG. 5 is a circuit diagram of a vehicle control device 100 according to a fourth embodiment.

FIG. 5 is a circuit diagram of a vehicle control device 100 according to a fourth embodiment of the present invention. In the fourth embodiment, both a first high voltage detection circuit 120 and a second high voltage detection circuit 150 use a common reference voltage source 190 as a reference voltage source. The common reference voltage source 190 provides a reference voltage that is used, as a comparison object, by a comparator of each high voltage detection circuit. Individual reference voltages may be common, or a reference voltage may be individually provided to each high voltage detection circuit. Other configurations are same as those of the first to third embodiments.

The common reference voltage source 190 can be configured as a circuit that generates the reference voltage by using its own power source, or can be configured as a circuit that receives a power supply from an external power supply B and converts this into the reference voltage. Moreover, for example, the common reference voltage source 190 can be configured as a circuit that receives a signal specifying a reference voltage value, via a signal input port provided in the vehicle control device 100, and generates the reference voltage according to the specified value.

By making the reference voltage source common, a circuit scale of the vehicle control device 100 can be reduced, and cost can be suppressed, while a same effect as that of the first to third embodiments is provided. Additionally, if a circuit specification of a CPU 170, an IC 180, or the like differs depending on types of vehicles, for example, the reference voltage can be flexibly changed according to these specific circuit specifications, by configuring such that the reference voltage is variable.

Fifth Embodiment

Figure 6:
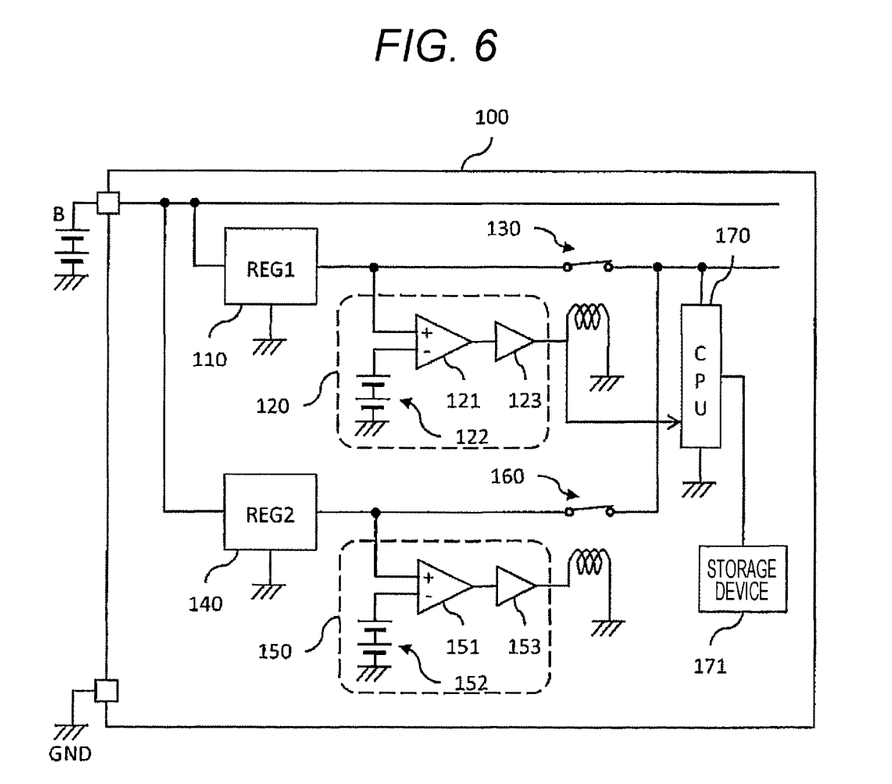
FIG. 6 is a circuit diagram of a vehicle control device 100 according to a fifth embodiment.

FIG. 6 is a circuit diagram of a vehicle control device 100 according to a fifth embodiment of the present invention. In the fifth embodiment, a first high voltage detection circuit 120 notifies a CPU 170 that the first constant voltage generation circuit 110 generates a voltage that exceeds a specified voltage. The CPU 170 stores a log describing the generation of the voltage, in a storage device 171. The storage device 171 is, for example, a data-writable memory, such as an electrically erasable and programmable read only memory (EEPROM). Other configurations are same as those of the first to fourth embodiments. FIG. 6 has exemplified a configuration provided with the storage device 171 in a circuit configuration of the second embodiment. An IC 180 has been omitted for convenience of description.

According to the fifth embodiment, if the constant voltage generation circuit generates an abnormal high voltage, a failure cause can be analyzed by analyzing the log stored by the storage device 171. Contents of the log include, for example, occurrence date and time of the abnormality, an (abnormal) output voltage value of the constant voltage generation circuit, or the like.

Modification of the Present Invention

The present invention is not limited to a form of the above-described embodiments, but also includes various modifications. The above embodiments have been described in detail for the purpose of easy explanation of the present invention, and are not necessarily limited to that provided with all the described configurations. Moreover, a part of a configuration of one embodiment can be replaced with a configuration of another embodiment. Further, a configuration of one embodiment can be added with a configuration of another embodiment. Furthermore, a part of a configuration of each embodiment can be added, deleted, or replaced with another configuration.

Although it has been described that the high voltage detection circuit detects a voltage abnormality by comparing the input voltage and the reference voltage with the comparator in the first to fifth embodiments, a, the configuration of the high voltage detection circuit is not limited to this, and an appropriate circuit configuration that achieves a same function can be used.

In the first to fifth embodiments, the CPU 170 and the IC 180 have been exemplified as the load circuit. Since the CPU 170 and the IC 180 generally need to be supplied with a constant voltage as an operating voltage, these are suitable for a load circuit supplied with a voltage by the constant voltage generation circuit. However, the load circuit is not limited to these, but can also be other circuit that uses a constant voltage as the operating voltage.

In the first to fifth embodiments, the first reference voltage is set larger than a rated voltage of the first constant voltage generation circuit 110 (e.g., 5 V), and more preferably, between the rated voltage of the first constant voltage generation circuit 110 and a maximum allowable voltage of the load circuit (e.g., 6 V). The second reference voltage is set larger than a rated voltage of the second constant voltage generation circuit 140, and more preferably, between the rated voltage of the second constant voltage generation circuit 140 and the maximum allowable voltage of the load circuit.

It has been described that, in the first to fifth embodiments, the output end of the first switch 130 and the output end of the second switch 160 are inputted to the output circuit configured by the wired OR circuit. The output circuit may be configured by using a configuration other than the wired OR, as long as it is a circuit that outputs any higher one of these output voltages.

It has been described that, in the fourth embodiment, the common reference voltage source 190 is configured to be able to generate the reference voltage itself, or to specify the reference voltage. The first reference voltage source 122 and the second reference voltage source 152 can have the same configuration.

REFERENCE SIGNS LIST 100 vehicle control device
110 first constant voltage generation circuit
120 first high voltage detection circuit
130 first switch
140 second constant voltage generation circuit
150 second high voltage detection circuit 160 second switch
170 CPU
171 storage device
180 IC

The invention claimed is:

1. A vehicle control device comprising:
a first constant voltage generation circuit and a second constant voltage generation circuit each configured to output a respective constant voltage to at least one of a central processing unit (CPU) and an integrated circuit (IC);
a first high voltage detection circuit configured to detect that the first constant voltage generation circuit has outputted a voltage equal to or more than a first reference voltage;
a second high voltage detection circuit configured to detect that the second constant voltage generation circuit has outputted a voltage equal to or more than a second reference voltage;
a first switch that is arranged between the at least one of the CPU and the IC and the first constant voltage generation circuit, and is configured to cut off a voltage output to the at least one of the CPU and the IC from the first constant voltage generation circuit when the first high voltage detection circuit detects that the first constant voltage generation circuit has outputted a voltage equal to or more than the first reference voltage;
a second switch that is arranged between the at least one of the CPU and the IC and the second constant voltage generation circuit, and is configured to cut off a voltage output to the at least one of the CPU and the IC from the second constant voltage generation circuit when the second high voltage detection circuit detects that the second constant voltage generation circuit has outputted a voltage equal to or more than the second reference voltage; and
an output circuit configured to selectively output the larger of an output voltage of the first switch and an output voltage of the second switch to the at least one of the CPU and the IC, wherein
the first reference voltage is larger than a rated voltage of the first constant voltage generation circuit,
the second reference voltage is larger than a rated voltage of the second constant voltage generation circuit,
a rated power of the first constant voltage generation circuit is different from a rated power of the second constant voltage generation circuit,
the first high voltage detection circuit is configured to output a first detection result to the at least one of the CPU and the IC,
the second high voltage detection circuit is configured to output a second detection result to the at least one of the CPU and the IC,
the at least one of the CPU and the IC is configured to receive, from the first high voltage detection circuit, the first detection result that the first constant voltage generation circuit has outputted a voltage equal to or more than the first reference voltage and to adjust a power consumption of the at least one of the CPU and the IC according to the first detection result, and
the at least one of the CPU and the IC is configured to receive, from the second high voltage detection circuit, the second detection result that the second constant voltage generation circuit has outputted a voltage equal to or more than the second reference voltage, and to adjust the power consumption of the at least one of the CPU and the IC according to the second detection result.

2. The vehicle control device according to claim 1, wherein
the rated power of the first constant voltage generation circuit is larger than the rated power of the second constant voltage generation circuit, and
the at least one of the CPU and the IC is configured to selectively implement processes that reduce a power consumption of the at least one of the CPU and the IC responsive to receiving the first detection result.

3. The vehicle control device according to claim 1, wherein
at least one of the first switch and the second switch comprises a semiconductor device.

4. The vehicle control device according to claim 1,
further comprising a reference voltage source configured to supply the first reference voltage to the first high voltage detection circuit and to supply the second reference voltage to the second high voltage detection circuit, wherein
the first reference voltage and the second reference voltage have a same voltage value.

5. The vehicle control device according to claim 1, comprising:
a first reference voltage source configured to supply the first reference voltage to the first high voltage detection circuit;
a second reference voltage source configured to supply the second reference voltage to the second high voltage detection circuit; and
a signal input port, wherein
the first reference voltage source is configured to specify the first reference voltage via the signal input port, and
the second reference voltage source is configured to specify the second reference voltage via the signal input port.

6. The vehicle control device according to claim 1, comprising:
a first reference voltage source configured to supply the first reference voltage to the first high voltage detection circuit; and
a second reference voltage source configured to supply the second reference voltage to the second high voltage detection circuit, wherein
the first reference voltage source is configured to generate the first reference voltage by using a power source, and
the second reference voltage source is configured to generate the second reference voltage by using the power source.

7. The vehicle control device according to claim 1, wherein
the first reference voltage is set between the rated voltage of the first constant voltage generation circuit and a maximum allowable voltage of the circuit; and
the second reference voltage is set between the rated voltage of the second constant voltage generation circuit and the maximum allowable voltage of the circuit.

8. The vehicle control device according to claim 1, further comprising a memory that stores data describing the first detection result of the first high voltage detection circuit and the second detection result of the second high voltage detection circuit.

* * * * *